United States Patent
DiLorenzo

(10) Patent No.: US 9,148,707 B2
(45) Date of Patent: Sep. 29, 2015

(54) SYSTEM AND METHOD TO PROVIDE OUT-OF-BAND BROADCAST TRIGGER SYNCHRONIZATION AND COMMUNICATION TO INSERTION DEVICES

(71) Applicant: LodgeNet Interactive Corporation, Sioux Falls, SD (US)

(72) Inventor: Mark DiLorenzo, Mission Viejo, CA (US)

(*) Notice: Subject to any disclaimer, the term of this patent is extended or adjusted under 35 U.S.C. 154(b) by 0 days.

(21) Appl. No.: 13/941,255

(22) Filed: Jul. 12, 2013

(65) Prior Publication Data
US 2014/0020013 A1    Jan. 16, 2014

Related U.S. Application Data

(60) Provisional application No. 61/671,547, filed on Jul. 13, 2012.

(51) Int. Cl.
*H04N 7/10* (2006.01)
*G06Q 30/00* (2012.01)
(Continued)

(52) U.S. Cl.
CPC ......... *H04N 21/812* (2013.01); *G06Q 30/0251* (2013.01); *H04N 1/32304* (2013.01); *H04N 5/04* (2013.01); *H04N 21/23614* (2013.01);
(Continued)

(58) Field of Classification Search
CPC ......... H04N 21/812; H04N 21/44016; H04N 21/858; H04N 21/478; H04N 21/4722; H04N 21/23614; H04N 21/4316; H04N 21/242; H04N 21/44008; H04N 21/458; H04N 21/2668; H04N 1/32304; H04N 21/4305; H04N 2201/328; H04N 5/04; G06Q 30/0251

USPC ................. 725/32, 34, 36; 705/14.49, 14.67; 375/240.28; 386/228, 337
See application file for complete search history.

(56) References Cited

U.S. PATENT DOCUMENTS

| 5,570,126 | A  | 10/1996 | Blahut et al. |
| 6,771,644 | B1 | 8/2004  | Brassil et al. |

(Continued)

FOREIGN PATENT DOCUMENTS

| WO | WO 2004/080073 | 9/2004 |
| WO | WO 2011/088263 | 7/2011 |

OTHER PUBLICATIONS

"Information technology—Generic coding of moving pictures and associated audio information: Systems," ISO/IEC, Dec. 1, 2000, ISO/IEC 13818-1 Second Edition, 174 pages.

(Continued)

*Primary Examiner* — Hoang-Vu A Nguyen-Ba
(74) *Attorney, Agent, or Firm* — Sheridan Ross P.C.

(57) ABSTRACT

A cue message detection synchronizer that provides an out-of-band cue message to downstream content insertion devices. The cue message detection synchronizer receives a first data stream corresponding to a network feed, receives a second data stream corresponding to a provider feed, receives at least one cue message associated with the first data stream, compares the first data stream to the second data stream to determine a data stream offset, and generates cue message comprising one or more of: (i) the determined data stream offset, and (ii) a timestamp associated with the generated cue message and modified by the determined data stream offset. In this way, a location within a synchronized provider stream can be provided to downstream content insertion devices.

20 Claims, 8 Drawing Sheets

(51) Int. Cl.

| | |
|---|---|
| *H04N 11/02* | (2006.01) |
| *H04N 5/92* | (2006.01) |
| *H04N 21/81* | (2011.01) |
| *H04N 21/478* | (2011.01) |
| *H04N 21/4722* | (2011.01) |
| *H04N 21/236* | (2011.01) |
| *H04N 21/431* | (2011.01) |
| *H04N 21/242* | (2011.01) |
| *H04N 21/44* | (2011.01) |
| *H04N 21/458* | (2011.01) |
| *G06Q 30/02* | (2012.01) |
| *H04N 21/2668* | (2011.01) |
| *H04N 1/32* | (2006.01) |
| *H04N 21/43* | (2011.01) |
| *H04N 5/04* | (2006.01) |
| *H04N 21/858* | (2011.01) |
| *H04N 5/77* | (2006.01) |

(52) U.S. Cl.
CPC ......... *H04N21/242* (2013.01); *H04N 21/2668* (2013.01); *H04N 21/4305* (2013.01); *H04N 21/4316* (2013.01); *H04N 21/44008* (2013.01); *H04N 21/44016* (2013.01); *H04N 21/458* (2013.01); *H04N 21/478* (2013.01); *H04N 21/4722* (2013.01); *H04N 21/858* (2013.01)

(56) References Cited

U.S. PATENT DOCUMENTS

| | | | |
|---|---|---|---|
| 7,318,075 | B2 | 1/2008 | Ashwin et al. |
| 7,634,787 | B1 | 12/2009 | Gebhardt et al. |
| 7,856,644 | B2 | 12/2010 | Nicholson et al. |
| 8,010,986 | B2 | 8/2011 | Dakss et al. |
| 8,214,429 | B2 | 7/2012 | Chidel et al. |
| 8,335,262 | B2 | 12/2012 | Hluchyj et al. |
| 2002/0087976 | A1 | 7/2002 | Kaplan et al. |
| 2003/0189668 | A1 | 10/2003 | Newnam et al. |
| 2004/0045022 | A1 | 3/2004 | Riedl |
| 2004/0210944 | A1* | 10/2004 | Brassil et al. ................. 725/135 |
| 2006/0245516 | A1 | 11/2006 | Simon |
| 2006/0253864 | A1 | 11/2006 | Easty |
| 2006/0287915 | A1 | 12/2006 | Boulet et al. |
| 2007/0064739 | A1 | 3/2007 | Krishnamachari |
| 2009/0210900 | A1 | 8/2009 | Kaftan |
| 2010/0014594 | A1* | 1/2010 | Beheydt et al. ........... 375/240.26 |
| 2010/0037253 | A1 | 2/2010 | Sheehan et al. |
| 2010/0169916 | A1* | 7/2010 | Stettner et al. ................. 725/34 |
| 2012/0096486 | A1 | 4/2012 | Stallard et al. |
| 2013/0083859 | A1* | 4/2013 | Nemiroff et al. ......... 375/240.25 |
| 2014/0149210 | A1* | 5/2014 | Ma et al. .................... 705/14.49 |
| 2014/0150019 | A1* | 5/2014 | Ma et al. ......................... 725/34 |

OTHER PUBLICATIONS

"Recommended Practice for SCTE 35 Digital Program Insertion Cueing Message for Cable," Society of Cable Telecommunications Engineers: Engineering Committee Digital Video Subcommittee, American National Standard ANSI/SCTE 67 2010, Nov. 2010, 56 pages.

Tom et al. "The Evolution of the Ad Campaign: The Dynamic Insertion of Digital Overlays into Linear & On-demand Content," SCTE's Cable-Tec Expo 2009, Nov. 2009, 27 pages.

* cited by examiner

SYSTEM AND METHOD TO PROVIDE OUT-OF-BAND BROADCAST TRIGGER SYNCHRONIZATION AND COMMUNICATION TO INSERTION DEVICES

CROSS REFERENCE TO RELATED APPLICATION

The present application claims priority to U.S. Provisional Patent Application No. 61/671,547, filed on Jul. 13, 2012, the entire contents of which are hereby incorporated by reference for all that it teaches and for all purposes.

FIELD OF THE INVENTION

The present invention relates generally to digital program insertion. More specifically, the present invention relates to providing out of band broadcast trigger synchronization and communication to program insertion devices to insert advertisements or other materials into a digitally encoded video stream, such as MPEG-2, MPEG-4, and H.264 encoded video.

BACKGROUND

Compressed image and video data is stored and transmitted in a standard format known as a compression stream. As is well-known in the art, MPEG (i.e., MPEG-1, MPEG-2, MPEG-4, H.264) compressed video and audio streams may be mapped to MPEG-2 Transport Streams as Elementary Streams (ES) packed into Packetized Elementary Transport (TS) packets. The PES packets contain a PES header which includes, among other things, a Presentation Time Stamp (PTS) and optionally a Decoding Time Stamp (DTS) (in the event the DTS is not present, the DTS is often considered to be equal to the PTS). Further, the MPEG-2 systems layer is responsible for the integration and synchronization of the elementary streams (ES): audio and video streams, as well as an unlimited number of data and control streams that can be used for various applications such as subtitles in multiple languages. This is accomplished by first packetizing the ESs thus forming the packetized elementary streams (PES). These PESs contain timestamps from a system clock for synchronization. The PESs are subsequently multiplexed to form a single output stream for transmission.

Existing methods for performing ad insertion utilize in band cue messages that are included in the broadcast video stream. The cue messages include information that identifies where in the video stream ad insertion points are located. That is, splice points are traditionally signaled in the MPEG-2 Transport Stream by means of STCE-35 cue messages. These messages contain the PTS value of the video frame that corresponds with the intended splice point. However, the process of encoding the broadcast video stream by the provider generally results in the insertion of new time stamps and the cue messages may be removed or selectively passed in the encoded output stream. As a result, the use of in band cue messages has required a high degree of cooperation from the encoded video stream provider (e.g. provider) and the party wishing to make use of the in band triggers. Accordingly, where the provider is unable or is otherwise unwilling to pass additional cue messages for reasons such as system compatibility issues with downstream devices, accurate insertion can be difficult or impossible to perform.

SUMMARY

It is with respect to the above issues and other problems that the embodiments presented herein were contemplated. In accordance with embodiments of the present disclosure, systems and methods are provided that utilize at least two content feeds, each generally having a video component and an audio component; a first feed is considered to be an original broadcast and/or Network feed that is provided by a broadcast Network while the second feed is considered to be a Provider feed which generally comprises an altered version, often encoded, of the Network feed, as discussed below. Specifically, one or more embodiments provide a system and method that supply cue messages in cases where the cue messages are not delivered in-band with a Provider's content or video stream. Such a method and system may be particularly useful when third parties such desire to insert advertising over the Providers local and/or national ad avails. Cue Messages may trigger the Ad Insertion process, a content insertion process, a content providing process, and/or optionally control the Break duration. There can be multiple Ads inserted during a Break. For example, for a one minute local break two 30 second Ads might be inserted. Even though multiple ads were inserted, the cues manage the break duration. The process of inserting Ad spots into the network signal is called a splice. Providers generally receive cue messages and break descriptors in-band along with the network program stream data provided by the Network. In many Providers' systems, such as cable and satellite television providers, the originating cue messages are received from the Network feed at the providers head end. These messages are then used internally for the Provider's ad insertion process and may eventually be filtered out of the Provider's feeds; that is, the cue messages are not passed on and are not available in the Provider's encoded video stream.

In some embodiments and consistent with the present disclosure, out-of-band cue messages that communicate the new location time stamp in the Provider's feed (e.g. encoded video stream) relative to the time stamp in the original signal stream (e.g. Network feed), are provided to downstream devices performing ad insertion using the Provider's encoded signal. In particular, embodiments of the invention identify the time offset, a time stamp and a frame associated with that time stamp in a video stream. In accordance with embodiments of the invention, the frames of video in the original video stream provided by the Network are synchronized with the frames of the encoded stream, provided by the Provider, using perceptual hashing and other data elements within the original source stream (e.g. Network) and encoded stream (e.g. Provider) to identify the matching frames within the two streams. In general, perceptual hashing allows video frames to be synchronized even where the encoding process introduces artifacts into the encoded video stream. A difference or delta between the location within the video stream of the time stamp after encoding (e.g. Provider) and the original location of that time stamp within the video stream (e.g. Network) is determined. The delta is then communicated to the downstream device party performing ad insertion. Using the delta, the location of the original time stamp can be determined from the location of the time stamp added to the video stream during the encoding process.

The delta between the location of a trigger within the original video stream and the location of the trigger in the encoded video stream can be calculated periodically. For example, the delta can be calculated for each trigger identified within the input video stream. The delta can be provided to network distribution nodes, such as head end facilities, as an out of band signal. For instance, the delta can be delivered over the Internet in the form of an SCTE35 cue message or other data forms such as in an .xml file. The receiving facility can then apply the delta in determining where an ad insertion point is located relative to a trigger received as part of the encoded video stream.

In accordance with embodiments of the present disclosure, a trigger synchronization/communication server is provided that is capable of detecting a trigger signal in an original video stream (e.g. Network) and determining a delta between the location of that trigger signal and the location of a trigger signal in the video stream after encoding (e.g. Provider). Different comparators can be included and used, alone or in various combinations, for matching frames of data between the unprocessed (e.g. Network) and processed (e.g. Provider) video streams. In at least one embodiment, video scene change detection may be used for sync verification. Moreover, the signal can be resynchronized after every insertion operation. In addition, multiple perceptual hashing algorithms or other frame identification algorithms can be applied to a video stream.

With respect to audio, a perceptual hash or similar method that would be more accurate for an audio stream can be applied. In particular, data within a stream is used to find and/or verify that there is a matched video frame of the input—output and from that calculate the time offset between the two. Also, the system may include an interface that connects to another device that can add/modify data associated with cue messages that can be used by the downstream devices to help make decisions with respect to Ad Spots that may be inserted. Alternatively, or in addition, the system may include an interface that connects to another device that can add/modify data that can be used by the downstream devices to help make decisions with respect to Ad Spots that may be inserted.

The proposed broadcast Trigger Synchronization method for providing out-of-band trigger information uses, in one or more combinations, one or more Perceptual hash algorithms for frame accurate synchronization between broadcast stream inputs (e.g. Network) and Providers' (e.g., multiple system operators, such as satellite and cable television providers) processing systems. This method allows synchronized out-of-band trigger data to be delivered to various media insertion systems.

The system's global synchronization methods may include MPEG-2 transport timing, video frame, audio, and Private Data/SEI message synchronization. The availability of these methods provides a highly flexible scheme which does not require advanced information as to the various forms of processing which may be used by Providers.

As previously mentioned, various video synchronization methods may be used. For example, video synchronization may be performed using Perceptual Hash methods. The video frame synchronization decision processes may use a combination of three Perceptual Hash methods in making frame comparisons. Perceptual hash algorithms are normally used to create a fingerprint of a multimedia file derived from various features from its content. Unlike cryptographic hash functions which rely on the avalanche effect of small changes in input leading to drastic changes in the output, perceptual hashes are "close" to one another if the features are similar.

Perceptual hashes are robust enough to take into account transformations or "attacks" on a given input and yet are flexible enough to distinguish between dissimilar files. Such attacks can include rotation, skew, contrast adjustment and different compression/formats. Thus Perceptual Hashing may be ideal for frame synchronization where the broadcast (e.g. Network) stream is reprocessed for delivery by Providers and such reprocessing can induce artifacts into the video stream.

According to some embodiments of the present invention, a method is provided, the method comprising receiving a first data stream corresponding to a network feed, receiving a second data stream corresponding to a provider feed, receiving at least one cue message associated with the first data stream, comparing the first data stream to the second data stream to determine a data stream offset, and generating a cue message, wherein the generated cue message comprises one or more of: (i) the determined data stream offset, and (ii) a timestamp associated with the generated cue message and modified by the determined data stream offset.

And yet in some embodiments, a system that provides out-of-band broadcast trigger synchronization and communication to at least one downstream device is provided, where the system comprises a cue message detection synchronizer comprising at least one comparator configured to compare one or more data stream elements associated with a network feed to one or more data stream elements associated with a provider feed, an offset timing generator configured to generate an offset between the one or more data stream elements associated with the network feed and the one or more data stream elements associated with the provider feed, wherein the cue message detection synchronizer is configured to generate a cue message comprising one or more of (i) the offset and (ii) a timestamp associated with the cue message and modified by the offset.

And further yet, a non-transitory computer readable medium is provide, the non-transitory computer readable containing instructions that when executed by a processor and memory, cause the processor to receive a first data stream corresponding to a network feed, receive a second data stream corresponding to a provider feed, receive at least one cue message associated with the first data stream, compare the first data stream to the second data stream to determine a data stream offset, and generate a cue message, wherein the generated cue message comprises one or more of: (i) the determined data stream offset, and (ii) a timestamp associated with the generated cue message and modified by the determined data stream offset.

And further yet, according to some embodiments of the present disclosure, a method is providing, the method comprising receiving, at a content insertion device, a cue message, wherein the cue message comprises one or more of (i) an offset, and (ii) an adjusted timestamp; wherein the one or more of (i) the offset, and (ii) the adjusted timestamp, account for a synchronization difference between a network feed and a provider feed.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

As will become apparent in view of the following disclosure, the various aspects and embodiments of the invention can be combined.

DETAILED DESCRIPTION

Figure 1:
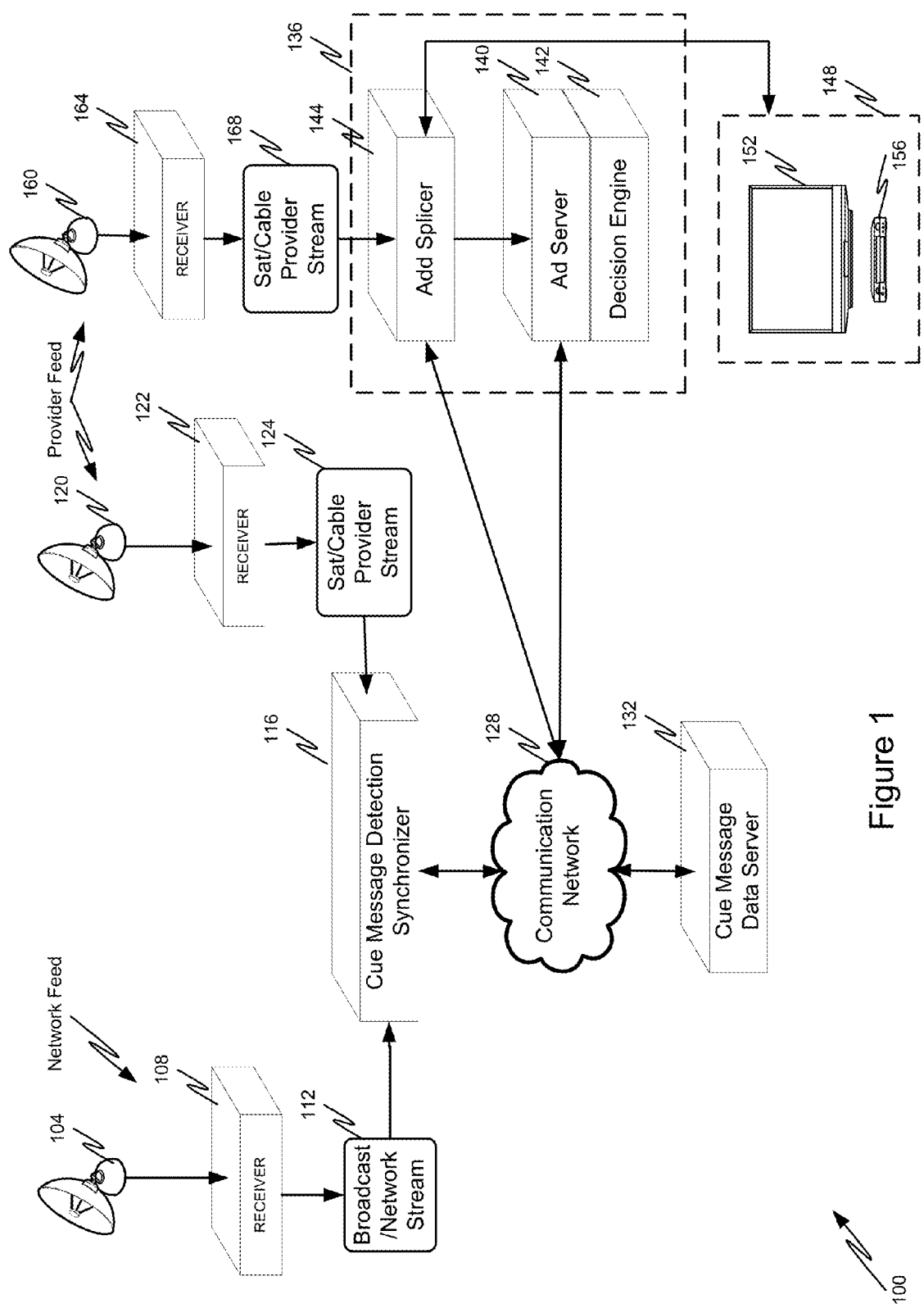
FIG. 1 illustrates an example of an out-of-band system 100 in accordance with embodiments of the present invention.

Referring initially to FIG. 1, an out-of-band cue system 100 is generally shown as being based around a cue message detection synchronizer 116. As previously discussed, an out-of-band cue system 100 utilizes at least two content feeds, each feed generally including a video component and an audio component; the first feed is generally considered to be an original broadcast and/or Network feed that is provided by a broadcast Network while the second feed is generally considered to be a Provider feed which may comprise an altered encoded version of the network feed. As depicted in FIG. 1, a Network feed is first received at receiving equipment, such as the satellite dish 104, and further processed at the receiver 108. Receiver 108 may be an Integrated Receiver/Decoder (IRD) that receives a content feed from the receiving equipment 104 and converts the content feed into an appropriate format for use with the cue message detection synchronizer 116. As one example, the receiver 108 may decode and/or otherwise convert a received ATSC, QAM, and/or 8_VSB signal into a transport stream (TS), where the transport stream includes one or more programs. For example, the transport stream may be a Single Program Transport Stream (SPTS) or a Multi Program Transport Stream (MPTS). The transport stream is then routed over Internet Protocol (IP), and constitutes a Broadcast Network stream 112. The Network stream 112 is then routed to the cue message detection synchronizer 116. Receiver 122 may be an Integrated Receiver/Decoder (IRD) that receives a content feed from the receiving equipment 120 and converts the content feed into an appropriate format for use with the cue message detection synchronizer 116. As one example, the receiver 122 may decode and/or otherwise convert a received ATSC, QAM, and/or 8_VSB signal into a transport stream (TS), where the transport stream includes one or more programs. For example, the transport stream may be a Single Program Transport Stream (SPTS) or a Multi Program Transport Stream (MPTS). The transport stream is then routed over Internet Protocol (IP), and constitutes a Provider Network stream 124. The Provider stream 124 is then routed to the cue message detection synchronizer 116.

The cue message detection synchronizer 116 may compare portions of a Network stream 112 and portions a Provider stream 124 to find the matching or otherwise corresponding locations in both streams. This process is called syncing and once in sync, an offset between the two streams can be calculated and used to modify PTS offsets in cue messages received in-band from the Network stream. Alternatively, or in addition, the offset between the two streams can be calculated and further used to provide a location within a Provider stream 124 of a trigger event and further provide location information in a cue message. These updated cue messages may then be passed to the cue message data server 132, via the communication network 128, which in turn passes the cue message to downstream equipment to insert content of some type; such content may correspond to an ad and the downstream equipment may perform ad insertion. Thus, the ad, or content, may be inserted into the Provider stream such that the inserted ad occurs at the same or similar location as it occurred in the Network stream. Alternatively, or in addition, such content may be interactive in nature and may be inserted, overlayed, or otherwise provided according to the identified location of the trigger event.

Communication network 128 may comprise any type of known communication medium or collection of communication media and may use any type of protocols to transport messages between endpoints. The communication network 128 may include wired and/or wireless communication technologies. The Internet is an example of the communication network 128 that constitutes an Internet Protocol (IP) network consisting of many computers, computing networks, and other communication devices located all over the world, which are connected through many telephone systems and other means. Other examples of the communication network 128 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 128 need not be limited to any one network type, and instead may be comprised of a number of different networks and/or network types.

The cue message data server 132 receives cue messages, break descriptors, and status messages from cue message detection synchronizer 116 and relays the cue messages to cue clients. The cue client, generally hosted within the splicer 144, must receive the cue messages, break descriptors, and status messages in enough time to enable ad insertion, or splice; thus cue messages may have the highest Internet delivery bandwidth and priority. The cue message data server 132 also delivers break descriptors containing break information; however, the delivery timing of break descriptors is not critical. Thus the cue message data server 132 allows for the flow and bandwidth control over break descriptors to reduce Internet bandwidth consumption at both the cue message data server and cue clients. In accordance with some embodiments of the current invention, the cue messages may correspond or otherwise adhere to the Society of Cable Telecommunications Engineers (SCTE) 35 standard, which is herein incorporated by reference in its entirety for all that it teaches and for all purposes.

Content insertion equipment, which may be ad insertion equipment 136, may reside at a location other than the location of the cue message detection synchronizer 116. For example, a Provider feed may be received at receiving equipment, such as the satellite dish 160, and further processed at the receiver 164. Receiver 164 may be the same or similar as receiver 122 and therefore the description has been omitted. Generally, there are three main processes running at the ad insertion equipment 136; the add server 140, the decision engine 142, and the add splicer 144. The ad server 140 handles the delivery of content to the ad splicer 144, downloads ad spots, and manages the storage of spots maintained on the ad server 140. In some embodiments, the ad server 140 may communicate with a content delivery network to receive configuration information, authentication information, and to provide status information back to the content delivery network. The ad server 140 may also communicate with, and deliver an ad according to a playlist to the ad splicer 144, which is spliced into the providers stream at the appropriate time. This time period in which ads are played is called a break. The decision engine 142 handles the decision making as to what ads are played during breaks. The ad decision engine 142 may also communicate with a content delivery network to receive configuration information and may further provide status information back to the content delivery network. A break has a duration defined by the Network; generally, a break is normally two—one minute breaks per hour for local avails and multiple breaks totaling six minutes per hour of national avails. An avail is an opportunity provide by the Network to a local affiliate to insert a commercial event into a program. The start of an avail is indicated as a splice event in the Network stream and the duration of the avail may vary from a few seconds to several minutes.

The timing and number of breaks that occur within the Network stream varies by each Network and are defined by break windows. A break window defines the window of time that a break will occur. The actual time that an ad insert takes place is provided by cue messages that are generally received sometime during a break window.

In accordance with embodiments of the present disclosure, the cue client may include a browser and may further reside at an end unit 148 which may comprise a television 152 and/or a set-top box 156. The cue client may utilize a received cue message to determine content to provide to display, show, and/or overlay at a location specified by trigger location. For example, the cue client may reference a URL included in the cue message to provide content at a time equal to or specified by the identified trigger location.

In accordance with embodiments of the present disclosure, for the ad splicer 144 to be prepared to insert ads, the ad splicer 144 receives a break descriptor in advance of a break which provides necessary information for the ad decision engine 142 to determine what ads to play for the specific break. As previously described, cue messages may trigger the ad insertion process and may control the break duration. In some embodiments, cue messages are generally sent out-of-band in advance of the actual insertion point by 5 or more seconds. This allows the ad server 140 to start delivering the ad spot and allow the ad splicer 144 to find the appropriate place within the Provider video stream to switch and start playing the ad. Additionally, there can be multiple ads inserted during a break. For example for a one minute local break two 30 second ads may be inserted. Even though multiple ads may have been inserted, the cue messages may manage the break duration. The splicer 144 handles the splicing of the ad into the stream; the splicer 144 may also handle stream grooming required to facilitate seamless splices.

To receive out-of-band cue messages/break descriptor messages, the splicer 144 initiates a connection to the cue message data server 132. When cue messages are delivered out-of-band, they are delivered in the same or similar format as they are when delivered in-band. The splicer 144 may receive cue messages and/or break descriptors and pass the received cue message to the ad server 140.

Since break descriptors are received in advance of cue messages, the ad server 140 has prepared for the break, created the playlist, filled out the full break duration with ad spots and waits for the cue message to occur. Each break descriptor may contain an ID that matches the ID in a cue message. These IDs allow the ad decision engine 142 to match a cue message to a break descriptor. Cue messages are usually received at least 5 seconds before the start of a break. The cue message contains the location of where the splicer 144 should make the splice within the Provider stream. Once the ad server 140 receives the cue message, it starts to deliver the ad spots to the splicer 144 and the splicer 144 is provided the time within the location of the Provider stream to make the splice. The spliced stream is then provided to an end unit 148 which may comprise a television 152 and/or a set-top box 156.

The communications between the splicer 144 and the ad decision engine 142 may be used to report a status as to the success or failure of the ad insert. The ad decision engine 142 may collect this information and may report it to the cue message data server 132 for tracking purposes.

Figure 2:
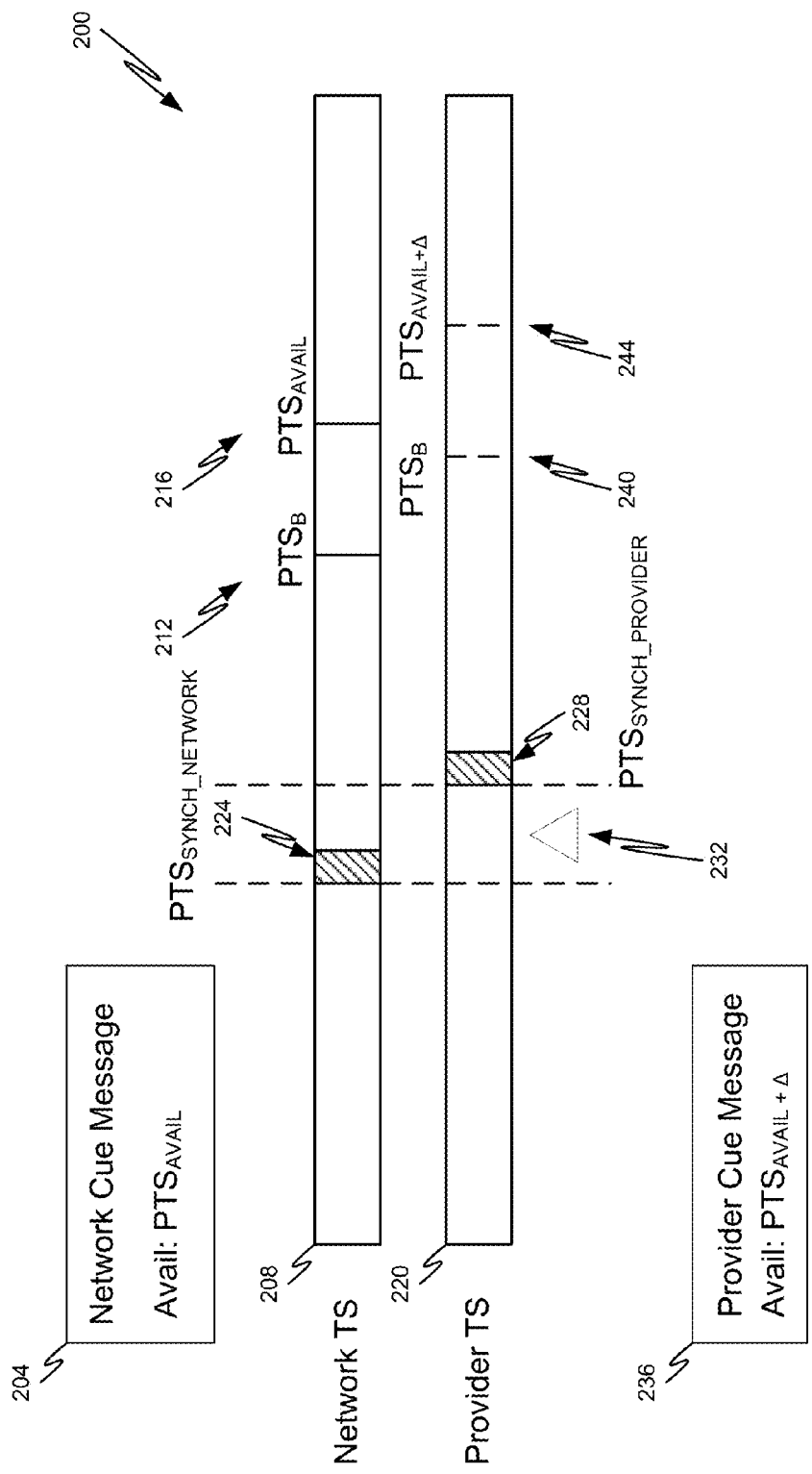
FIG. 2 depicts an illustration of a Network and Provider stream synchronization in accordance with embodiments of the present invention.

In accordance with at least some embodiments of the present disclosure, FIG. 2 illustrates an example synchronization 200 that may occur at the cue message detection synchronizer 116. The cue message detection synchronizer 116 may receive a network cue message 204 as part of a transport stream sent from the Network provider. For example, the Network stream may comprise the Network transport stream. 204. As previously discussed, the cue message of the Network transport stream may include an avail time equal to a presentation time stamp (PTS), also known as the time at which a particular ad is to be displayed. For instance, network cue message 204 may include an avail time of $PTS_{Avail}$. As illustrated in FIG. 2, the $PTS_{Avail}$ time may correspond to location 216 within the Network transport stream 208. In some embodiments, a previous break descriptor may have indicated that a break is to occur at location 212 within the Network transport stream 208.

The cue message detection synchronizer 116, having received a Provider transport stream 220 in addition to the Network transport stream 208, may initiate a synchronization process to synchronize the Network stream and the Provider stream. For example, at least one element of the Network transport stream 208 and at least one element of the Provider transport stream 220 may match. As illustrated in FIG. 2, element 224 of the Network transport stream 208 and element 228 of the Provider transport stream match. Element 224 and element 228 may comprise, but are not limited to, a frame of video, an audio slice, parsed transport data, message data, and combinations thereof. The cue message detection synchronizer 116 then determines a PTS for each matched frame, or location, in each of the Network transport stream 208 and the Provider transport stream 220. For example and as depicted in FIG. 2, element 224 has a PTS of $PTS_{Synchronization\_Network}$; the element 228 has a PTS of $PTS_{Synchronization\_Provider}$. A difference $\Delta$ 232 between $PTS_{Synchronization\_Network}$ and $PTS_{Synchronization\_Provider}$ is then calculated, wherein the difference corresponds to a determined offset between the Network stream and the Provider stream. Accordingly, the network cue message 204 may be updated to reflect a cue message for the Provider stream, which is to be provided to an ad splicer 144. Thus, the determined offset, or difference $\Delta$ 232, is added to the Avail presentation timestamp of the network cue message 204, resulting in a provider cue message 238 having a corresponding Avail equal to the $PTS_{Avail+\Delta}$. Alternatively, or in addition, the determined offset, or difference $\Delta$ 232, may be included in a presentation timestamp adjustment, such as the PTS_Adjustment field. Alternatively, or in addition, the offset may be provided as a timestamp or otherwise used to modify a timestamp associated with the cue message. As further illustrated in FIG. 2, the $PTS_{Avail+\Delta}$ may correspond to location 244 in the Provider transport stream 220 following a break at location 240. The Provider cue message 236 may then be sent to the cue message data server 132, as previously discussed. Therefore, the receiving facility may then insert and ad at an appropriate time according to the determined delta. Alternatively, or in addition, a receiving facility may apply the delta in determining where an ad insertion point is relative to a trigger received as part of an encoded Provider stream. For example, a receiving facility may alter a timing of a splice based on the delta.

Although the network transport stream 208 and the provider transport stream 220 are illustrated as transport streams having matched elements, it should be noted that the matched elements may occur in a demultiplexed version of the transport streams. For instance, the element identified as a matching element between both streams may correspond to a video frame, an audio frame, transport stream data and/or private data or supplemental enhancement information (SEI). Further, the matching elements 224 and 228 may correspond to elements within elementary streams (audio and/or video) and/or other portions of the header and/or payload of the transport stream 220, a header and/or payload of a packetized elementary stream, and the like.

Figure 3:
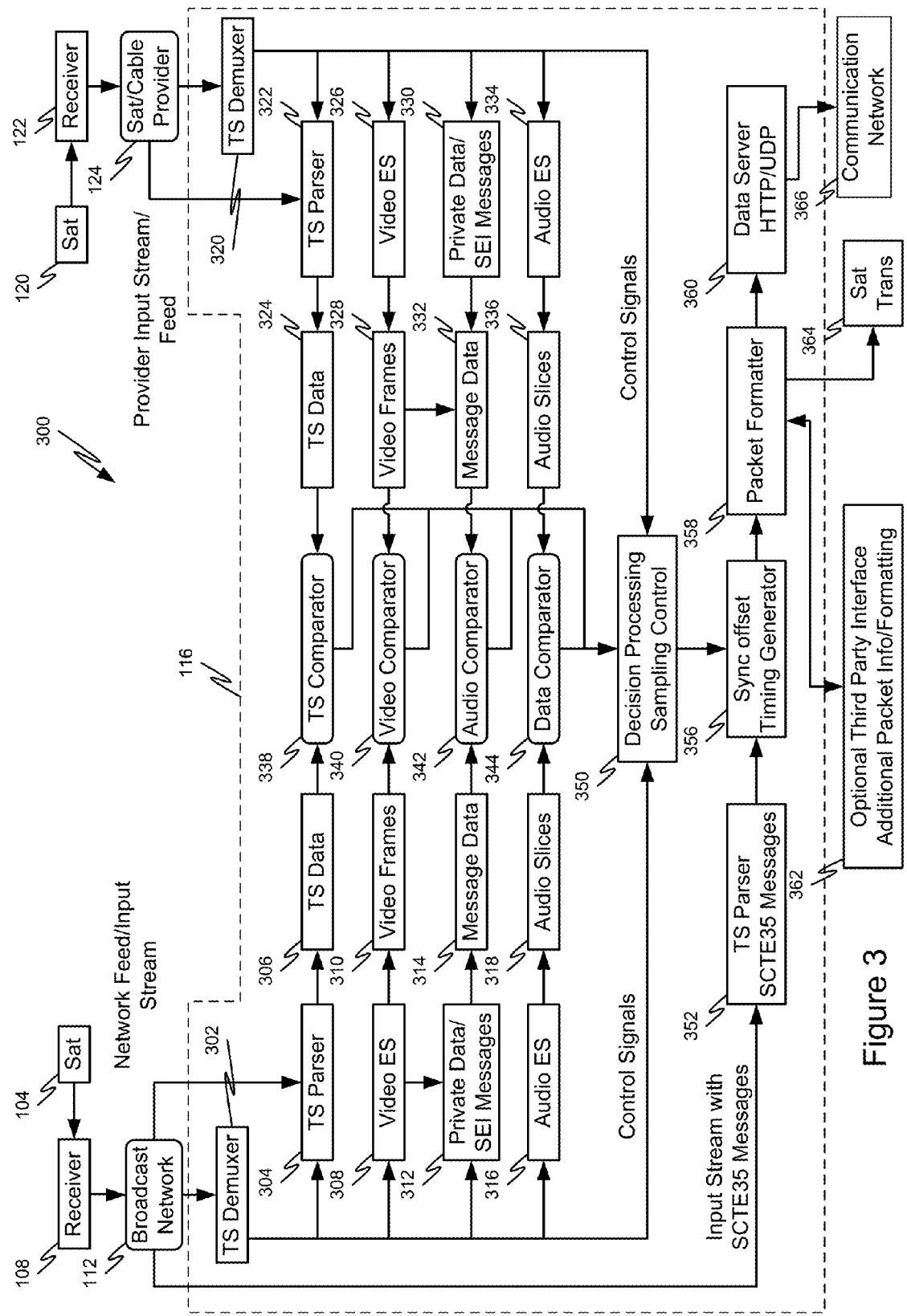
FIG. 3 depicts an out-of-band cue system 300 in accordance with embodiments of the present invention.

FIG. 3 illustrates an example of an out-of-band cue system 300 in accordance with embodiments of the present disclosure. As previously discussed, receiving equipment 104 may receive a Network feed and provide such feed to the receiver 108. The receiver 108 may be an Integrated Receiver/Decoder (IRD) that receives a Network feed from the receiving equipment 104 and converts the Network feed into an appropriate format for use with the cue message detection synchronizer 116. For example, the cue message detection synchronizer 116 may include a transport stream (TS) demultiplexer 302 which may demultiplex a TS into one or more portions. As one example, a Network TS may be demultiplexed into one or more of video elementary stream 308, audio elementary stream 316, and private data/SEI messages 312 using known methods. For example, the SEI messages may be received from the elementary stream of the video 308. Further, cue message detection synchronizer 116 may also include a transport stream parser 304 for parsing the demultiplexed Network transport stream. The TS parser 304 may provide one or more data, such as TS data 306, that may be used by the cue message detection and synchronizer 116. TS data 306 may include TS header information.

As further illustrated in FIG. 3, the video elementary stream 308 may produce one or more video frames 310 for use by the cue message detection and synchronizer 116; the audio elementary stream may produce one or more audio slices 318 for use by the cue message detection and synchronizer 116; and the private data/sei messages 312 may result in message data 314 for use by the cue message detection and synchronizer 116.

As previously discussed, receiving equipment 120 may receive a Provider feed and provide such feed to the receiver 122. The receiver 122 may be an Integrated Receiver/Decoder (IRD) that receives a Provider feed from the receiving equipment 120 and converts the Provider feed into an appropriate format for use with the cue message detection synchronizer 116. For example, the cue message detection synchronizer 116 may include a transport stream (TS) demultiplexer 320 which may demultiplex a TS into one or more portions. As one example, a Provider TS may be demultiplexed into one or more of video elementary stream 326, audio elementary stream 334, and private data/SEI messages 330 using known methods. For example, the SEI messages may be received from the elementary stream of the video 326. Further, cue message detection synchronizer 116 may also include a transport stream parser 322 for parsing the demultiplexed Provider transport stream. The TS parser 322 may provide one or more data, such as TS data 324, that may be used by the cue message detection and synchronizer 116. Again, TS data 324 may include TS header information.

As further illustrated in FIG. 3, the video elementary stream 326 may produce one or more video frames 328 for use by the cue message detection and synchronizer 116; the audio elementary stream may produce one or more audio slices 318 for use by the cue message detection and synchronizer 116; and the private data/SEI messages 330 may result in message data 332 for use by the cue message detection and synchronizer 116.

In accordance with at least some embodiments of the present disclosure, the video frames 310 from the Network stream are compared to the video frames 328 from the Provider stream and are used to synchronize the two network streams at 340. For example, perceptual hashing may be used to determine close or matching frames within the Network and Provider transport streams. Perceptual hashing algorithms may include, but are not limited to RADIS (radical hash), DCT hash, and Marr/Mexican hat wavelet. As one example, a perceptual hash algorithm may be applied to one or more frames in a video elementary stream. Upon detecting a match, via the perceptual hashing algorithm, between two video frames, where one video frame is from each of the Network and Provider streams, the cue message detection synchronizer 116 may determine an offset between, or a difference in a PTS, between the identified matched frames.

The difference may then be used to generate a synchronization offset and applied to an in-band cue message received from the Network.

In some embodiments, a threshold calibration is used to set decision threshold values for determining a match between two frames and/or two streams. For example, and depending on the Provider, a "closeness" of match threshold may be set such that a closeness value above the threshold indicates a match, while a closeness value below the threshold does not indicate a match. Alternatively, or in addition, the threshold calibration may be determined on an automatic basis. Such thresholds may be ideal in situations where frame to frame differences of the same elementary stream are minuscule, extreme, and/or vary in some manner.

In accordance with at least some embodiments of the present disclosure, the audio slices 318 from the Network stream are compared to the audio slices 336 from the Provider stream to synchronize the two network streams at 344. For example, perceptual hashing may be used to determine close or matching slices of audio within the Network and Provider streams. Perceptual hashing algorithms may include, but are not limited to hashing algorithms that identify a set of acoustic features such as periodicity, frequency, spectra flatness, spectral crest, and the like and/or further create an acoustic fingerprint. As one example, a perceptual hash algorithm may be applied to one or more slices in an audio elementary stream. Upon detecting a match, via the perceptual hashing algorithm, between two audio slices, where one audio slice is from each of the Network and Provider streams, the cue message detection synchronizer 116 may determine an offset between, or a difference in a PTS, between the identified matched slices. The difference may then be used to generate a synchronization offset.

In some embodiments, a threshold calibration is used to set decision threshold values for determining a match between two slices and/or two streams. For example, and depending on the Provider, a "closeness" of match threshold may be set such that a closeness value above the threshold indicates a match, while a closeness value below the threshold does not indicate a match. Alternatively, or in addition, the threshold calibration may be determined on an automatic basis. Such threshold may be ideal in situations where slice to slice audio differences of the same elementary stream are minuscule, extreme, and/or vary in some manner.

In accordance with at least some embodiments of the present disclosure, the transport stream data 306 from the Network stream are compared to the transport stream data 324 from the Provider stream to synchronize the two network streams at 338. For example, perceptual hashing may be used to determine close or matching transport stream data within the Network and Provider streams. Perceptual hashing algorithms may include, but are not limited to hashing algorithms or other methods for uniquely identifying similar transport data between two streams. As one example, a perceptual hash algorithm may be applied to the information contained in the TS headers, PES headers, ES headers, and/or other information in stream headers, to identify one or more headers containing similar information. As another example, PES features, such as an intra slice refresh, may be utilized to synchronize the Network and Provider streams. Upon detecting a match or other similarities, via the perceptual hashing algorithm, between two sets of TS data, where one set of TS data is from each of the Network and Provider streams, the cue message detection synchronizer 116 may determine an offset between, or a difference in a PTS, between the parsed transport stream data. The difference may then be used to generate a synchronization offset.

In some embodiments, a threshold calibration is used to set decision threshold values for determining a match between two sets of TS data and/or two streams. For example, and depending on the Provider, a "closeness" of match threshold may be set such that a closeness value above the threshold indicates a match, while a closeness value below the threshold does not indicate a match. Alternatively, or in addition, the threshold calibration may be determined on an automatic basis.

In accordance with at least some embodiments of the present disclosure, the message data 314 from the Network stream are compared to the message data 332 from the Provider stream to synchronize the two network streams at 342. For example, perceptual hashing may be used to determine close or matching message data within the Network and Provider streams. Perceptual hashing algorithms may include, but are not limited to hashing algorithms or other methods for uniquely identifying similar message data between two streams. As one example, a perceptual hash algorithm may be applied using a scene SEI message to identify one or more scene SEI messages containing similar information. As another example, scene SEI messages may indicate whether a picture is a scene-cut, part of a dissolve, or other type of transition. Upon detecting a match or other similarities, via the perceptual hashing algorithm, between two sets of message data, where one set of message data is from each of the Network and Provider streams, the cue message detection synchronizer 116 may determine an offset between, or a difference in time, between the message data. The difference may then be used to generate a synchronization offset.

In some embodiments, a threshold calibration is used to set decision threshold values for determining a match between two sets of message data and/or two streams. For example, and depending on the Provider, a "closeness" of match threshold may be set such that a closeness value above the threshold indicates a match, while a closeness value below the threshold does not indicate a match. Alternatively, or in addition, the threshold calibration may be determined on an automatic basis.

It should be noted that the cue message detection synchronizer 116 may use one or more of the TS data, Video Frame, Message data, and Audio slices to synchronize the two streams.

One or more synchronizations are identified and the cue message detection synchronizer 116 may determine a single offset using a single comparison from 338, 340, 342, and/or 344, or the cue message detection synchronizer 116 may utilize a combination of the comparisons to determine the offset to be used. Additionally, synchronization may include two or more stages, where a first stage determines one or more matching areas of a Network feed and a Provider feed, followed by another synchronization stage that occurs such that one or more matching elements, such as frames, of the Network feed and the Provider feed are determined. Moreover, control signals may be received and may further play a role in determining whether a synchronization is to occur and/or a cue message is to be provide. If a synchronization is to occur and/or a cue message is to be provided, the determined offset is then provided to the sync offset timing generator 356 such that the offset can be accounted for in the out-of-band SCTE35 message parsed from the Provider stream. More specifically, one or more TS Parser SCTE35 messages 352 are parsed to identify timing information pertaining to a Network message cue. The determined synch offset timing generator 356 adds, modifies, or otherwise updates the offset information of the Network cue message. The modified Network cue message is then provided to the packet formatter 358 such the information from the updated Network cue message containing the offset information is wrapped in an SCTE35 message wrapper.

In some embodiments, optional third party interfaces and/or additional packet information and formatting requirements may be received such that the information from the updated Network cue message containing the offset information is altered according to an external interface packet format 358. As one example, the formatted packet, or the information from the updated Network cue message containing the offset information, may adhere to a standard for transmitting cue messages in an .xml file. As another example, the actual offset may simply be added to the PTS of a Network cue message, the Network cue message then being routed to the cue message data server 132 such that an ad may be inserted into a Provider stream. Alternatively, or in addition, the offset is simply stored in a field of the Network cue message, the cue message then being routed to the cue message data server such that an ad may be inserted into a Provider stream.

The cue message for the provider network may then be uploaded via a satellite transmission or may be provided to the cue message data server 132 via a data server 360.

Figure 4:
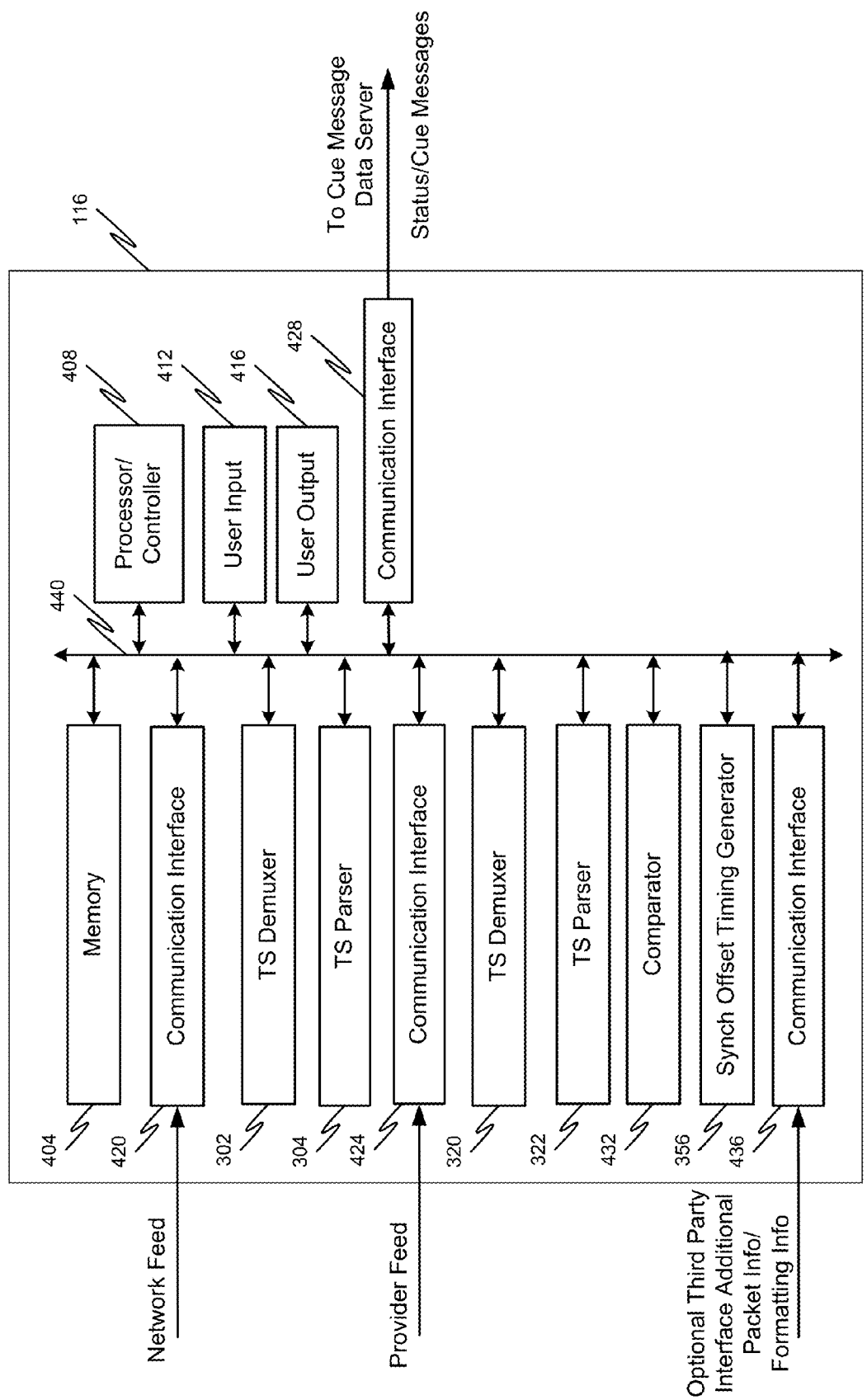
FIG. 4 depicts details of a cue message detection synchronizer 116 in accordance with embodiments of the present invention.

FIG. 4 illustrates a block diagram depicting one or more components of a cue message detection synchronizer 116. The cue message detection synchronizer 116 may include a processor/controller 408 capable of executing program instructions. The processor/controller 408 may include any general purpose programmable processor or controller for executing application programming. Alternatively, or in addition, the processor/controller 408 may comprise an application specific integrated circuit (ASIC). The processor/controller 408 generally functions to execute programming code that implements various functions performed by the cue message detection synchronizer 116 in accordance with at least some embodiments of the present disclosure.

The cue message detection synchronizer 116 may additionally include memory 404. The memory 404 may be used in connection with the execution of programming instructions by the processor/controller 408, and for the temporary or long term storage of data and/or program instructions. For example, the processor/controller 408, in conjunction with the memory 404 of the cue message detection synchronizer 116, may implement cue message detection synchronization applications and web services that are used to make available one or more cue messages.

The memory 404 of the cue message detection synchronizer 116 may comprise solid state memory that is resident, removable and/or remote in nature, such as DRAM and SDRAM. Moreover, the memory 404 may comprise a plurality of discrete components of different types and/or a plurality of logical partitions. In accordance with still other embodiments, the memory 404 comprises a non-transitory computer readable storage medium. Such a medium may take many forms, including but not limited to, non-volatile media, volatile media, and transmission media.

The memory 404 of the cue message detection synchronizer 116 may further be operable to store configuration logs, captured files, and/or cue messages. Specifically, the cue message detection synchronizer 116 may include one or more communication interfaces 420 for receiving a Network stream. In particular, the Network stream may be a single program transport stream (SPTS) or a multi-program transport stream (MPTS). As previously discussed, the cue message detection synchronizer 116 includes a TS demultiplexer 302 and a TS parser 304. Moreover, the cue message detection synchronizer 116 may include one or more communication interface 424 for receiving a Provider stream. In particular, the Provider stream may be a single program transport stream (SPTS) or a multi-program transport stream (MPTS). As previously discussed, the cue message detection synchronizer 116 includes a TS demultiplexer 320 and a TS parser 322. The cue message detection synchronizer 116 may also include a comparator 432; the comparator 432 may correspond to or otherwise be associated with comparators 338, 340, 342, and/or 344 as discussed with respect to FIG. 3. In some embodiments, the cue message detection synchronizer 116 may also include a communication interface 436 for receiving the optional third party interface packet information and/or other third party formatting information.

The cue message detection synchronizer 116 may further include user input devices 412 and user output devices 416 to be used in connection with the cue message detection synchronizer 116 cue message detection synchronizer 116. For example, a user may enter information, and/or make a selection using user input device 412. Other examples of user input devices 412 include a keyboard, a numeric keypad, a touch screen, a microphone, scanner, and pointing device combined with a screen or other position encoder. Examples of user output devices 416 include a display, a touch screen display, a speaker, a printer, and a tactile feedback component that provides tactile feedback using for example, vibration, heat, electrical, or any other type of feedback. The cue message detection synchronizer 116 may include a communication interface 428 to allow for communication between the cue message detection synchronizer 116 and the cue message data server 132. The status and/or the cue messages may then be transmitted over the communication interface 328 to the cue message data server 132.

Figure 5:
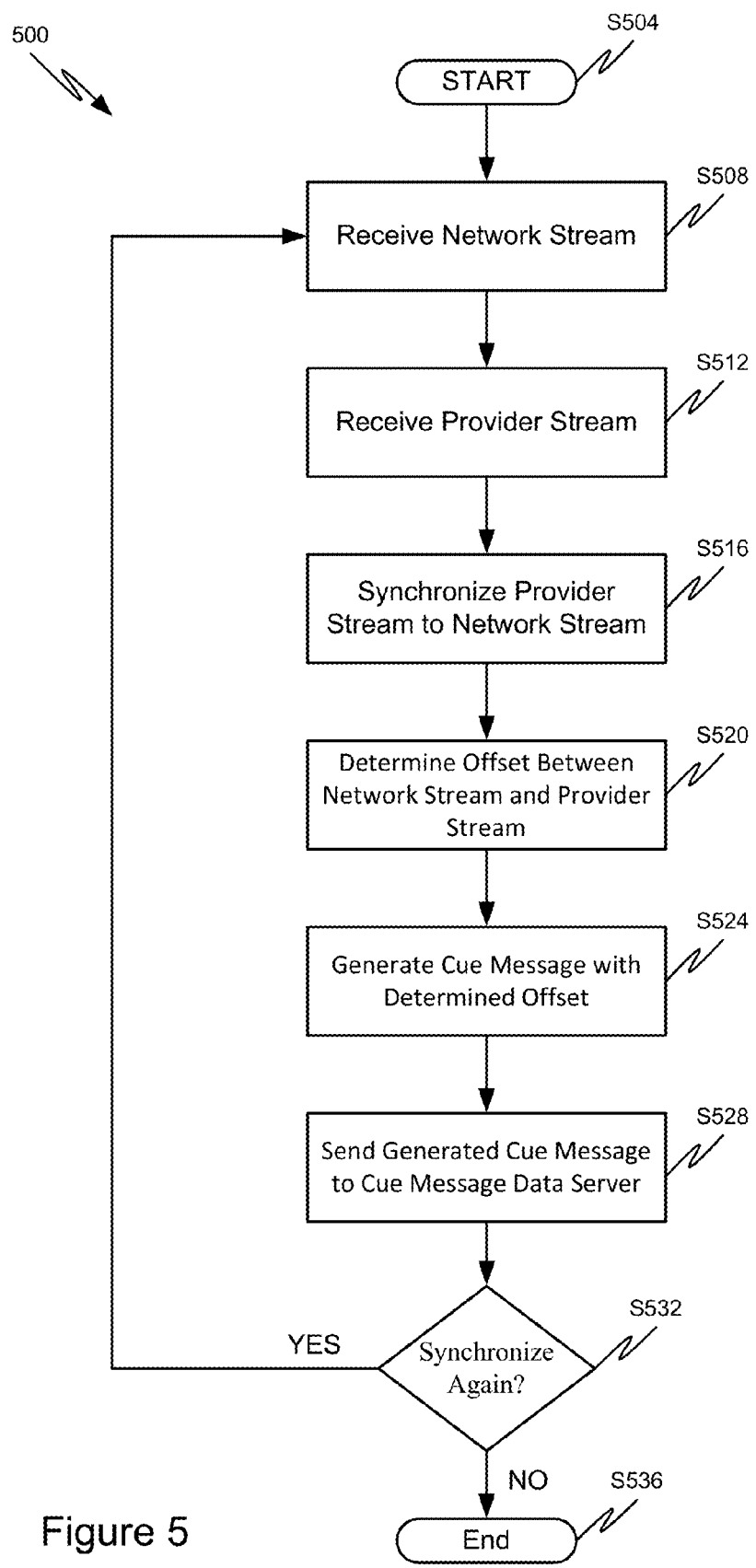
FIG. 5 depicts a flowchart showing the operation of an example of a method in accordance with embodiments of the present invention.

Referring now to FIG. 5, a method 500 of detecting and synchronizing cue messages will be discussed in accordance with embodiments of the present disclosure. Method 500 is in embodiments, performed by a device, such as the cue message detection synchronizer 116. More specifically, one or more hardware and software components may be involved in performing method 500. In one embodiment, one or more of the previously described modules and/or devices perform one or more of the steps of method 500. The method 500 may be executed as a set of computer-executable instructions executed by a computer system or cue message detection synchronizer 116 and encoded or stored on a computer-readable medium. Hereinafter, the method 500 shall be explained with reference to systems, components, modules, software, etc. described with FIGS. 1-4.

Method 500 may continuously flow in a loop, flow according to a timed event, or flow according to a change in an operating or status parameter. Method 500 is initiated at step S504 where a cue message detection synchronizer 116 may start one or more functions. At step S508, a cue message detection synchronizer 116 may receive a Network stream corresponding to a Network Transport Stream. The received Network Transport stream may be encoded. At step S512, a cue message detection synchronizer 116 may receive a Provider stream corresponding to a Provider Transport Stream. The received Provider Transport stream may be encoded. It is important to note that steps S508 and S512 may occur simultaneously or in parallel.

At step S516, the Provider Stream is synchronized to the Network stream. For example, at step S516, perceptual hashing may be utilized to identify similar elements, such as similar video frames, similar audio slices, similar transport stream data, and similar private data/SEI message data. If a similar element has been identified, method 500 them moves to step S520 where an offset between the network stream and the provider stream is determined. In some embodiments, the offset may be determined by identifying a PTS of each of the identified similar elements. That is, a difference or delta between the location with the video stream of the time stamp after encoding and the original location of that time stamp within the video stream is determined.

At step S524, a cue message provided by the Network stream is updated. For instance, the cue message may receive the previously determined offset and add it to the Avail time for the Network stream. Alternatively, or in addition, the previously determined offset may be included in the updated and/or new cue message. Once the offset has been determined and included, in some manner, in the cue message, the cue message detection synchronizer 116 sends the updated cue message to the Cue Message Data Server 132, where the cue message will be passed to ad insertion equipment, such as equipment 136, and/or a head end facility. Alternatively, or in addition, at step S524 the offset is delivered to the cue message data server 132 in another data form, such as in an .xml file. The receiving facility may then apply the delta in determining where an ad insertion point is relative to a trigger received as part of the encoded video stream.

Once the offset has been sent to the cue message data server 132, method 500 flows to step S532, where the method determines whether nor to calculate another offset. The delta between the location of a trigger within the original video stream (Network) and the location of the trigger in the encoded video stream can be calculated periodically. For example, the delta can be calculated for each trigger identified within the input video stream. Thus, if another trigger is to be identified, method 500 flows back to step S508 where the process repeats. Otherwise, method 500 ends at step S536.

Figure 6:
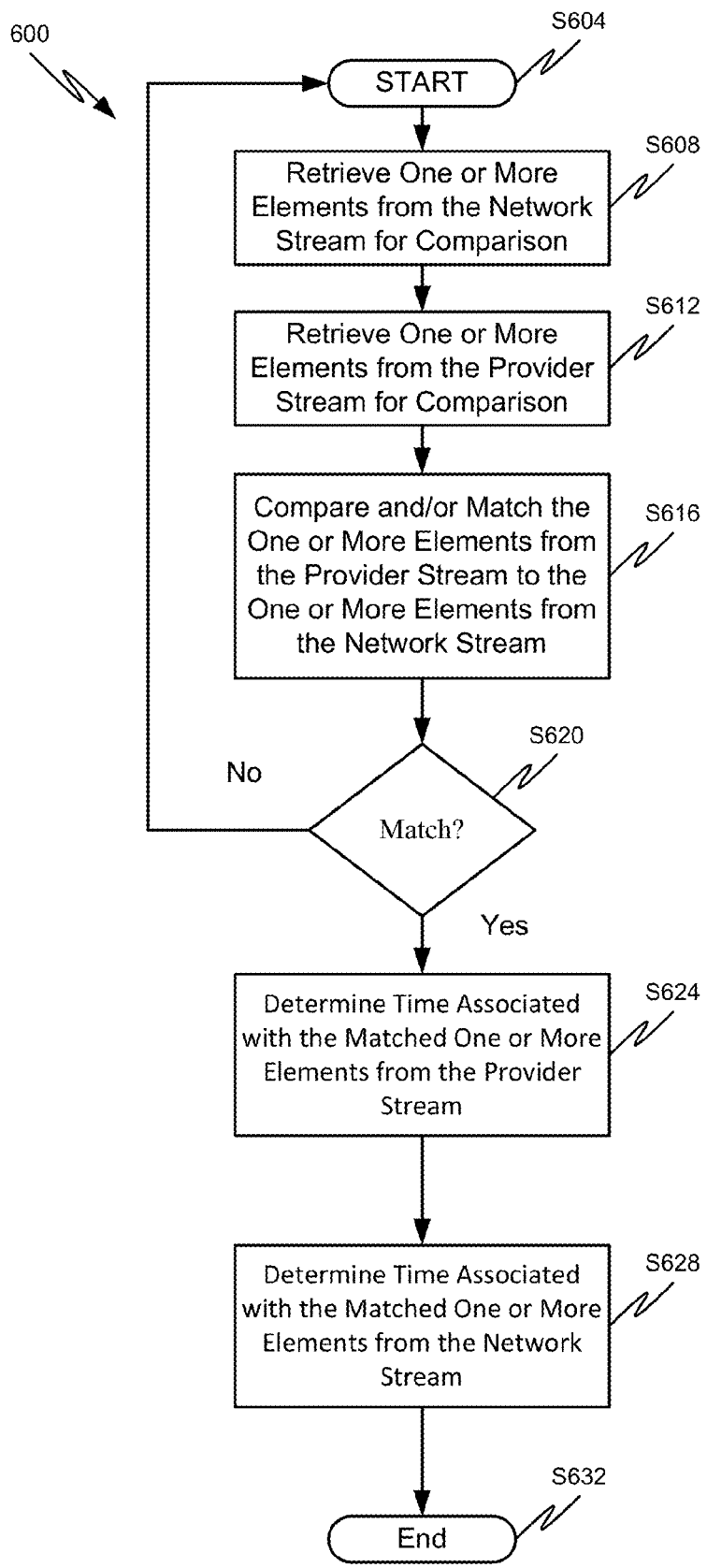
FIG. 6 depicts a flowchart showing the operation of an example of a second method in accordance with embodiments of the present invention.

Referring now to FIG. 6, method 600 corresponding to additional details of step s516 will be discussed with respect to synchronizing the provider stream to the network stream in accordance with embodiments of the present disclosure. Method 600 is in embodiments, performed by a device, such as the cue message detection synchronizer 116. More specifically, one or more hardware and software components may be involved in performing method 600. In one embodiment, one or more of the previously described modules and/or devices perform one or more of the steps of method 600. The method 600 may be executed as a set of computer-executable instructions executed by a computer system or cue message detection synchronizer 116 and encoded or stored on a computer-readable medium. Hereinafter, the method 600 shall be explained with reference to systems, components, modules, software, etc. described with FIGS. 1-5.

Method 600 may continuously flow in a loop, flow according to a timed event, or flow according to a change in an operating or status parameter. Method 600 is initiated at step S604 where it is determined that one or more elements are to be retrieved from the Network stream for comparison. For example, the cue message detection synchronizer 116 may consult one or more configuration logs having one or more parameters specifying elements to be retrieved from the Network stream. At step S604, Method 600 then retrieves the one or more elements from the Network Stream for comparison. Method 600 ten proceeds to step s608 where Method 600 retrieves one or more elements from the Provider stream for comparison. Similar to step S608, the cue message detection synchronizer 116 may consult a configuration profile or log to determine which element to retrieve from the Provider stream. Method 5608 then proceeds to step S616.

At step S616, the message cue detection synchronizer 116 then compares and/or matches the retrieved one or more elements from the Network stream to the one or more elements retrieved from the Provider stream. If the two elements match at 5620, the Method 600 then proceeds to step S624 where a time associated with the matched one or more elements from the Provider stream is determined. Such time may be a presentation timestamp. Method 600 then proceeds to step S632 where a time associated with the matched one or more elements from the Network stream is determined. Again, the associated time may be a presentation timestamp. Method 600 may then end at step S632 where the time associated with the one or more matched elements of the Network stream and the one or more elements of the Provider stream are utilize in accordance with method 500.

If, at step S620, the one or more elements from the Network stream do not match the one or more elements from the Provider stream, method 600 may return to step S604 where one or more elements shifted in time from the Network stream and/or the Provider stream are retrieved. Thus, method 600 may repeat utilizing different elements for matching and/or comparison.

Figure 7:
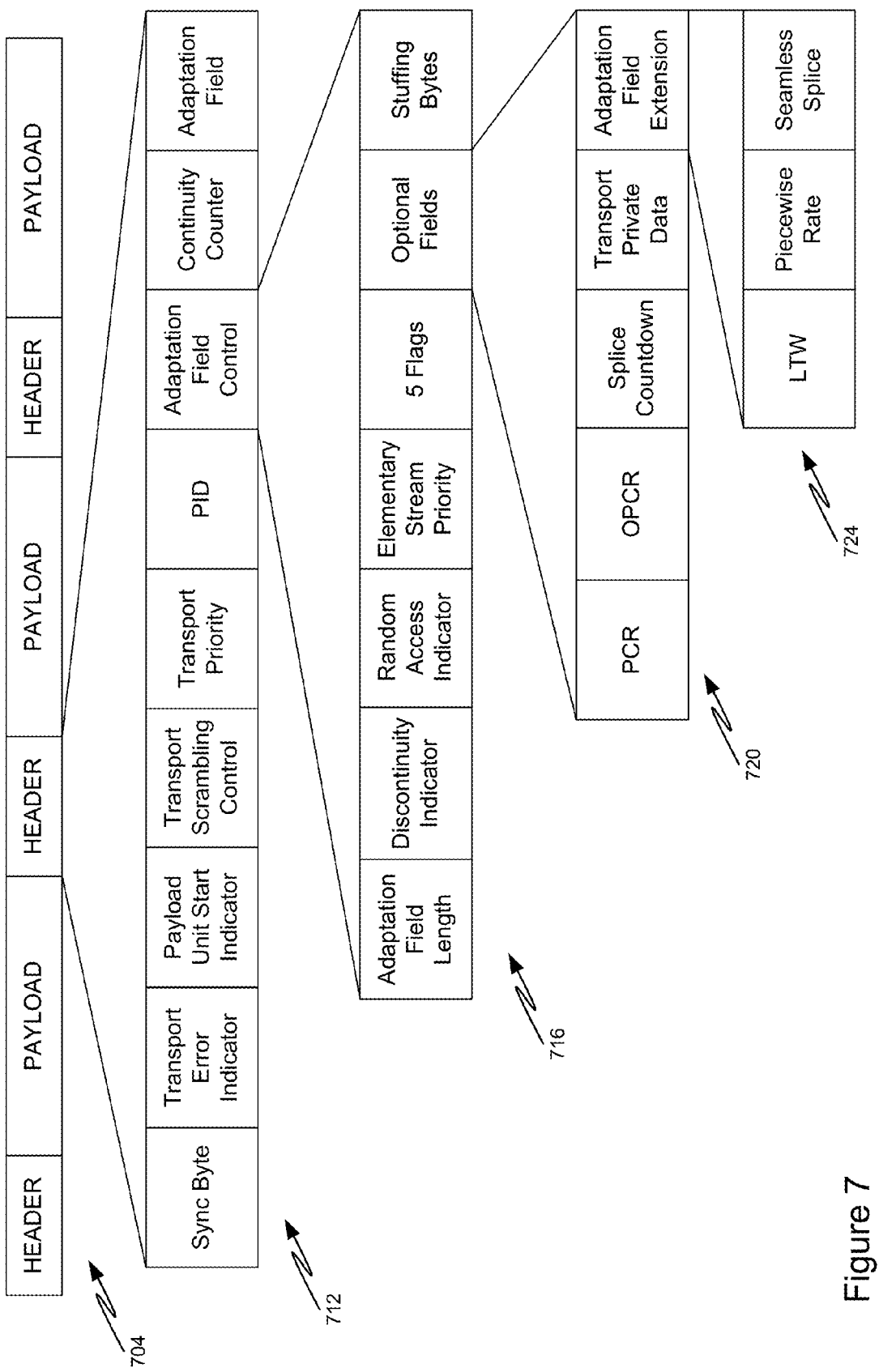
FIG. 7 depicts an example of a Transport Stream (TS), including TS header information.

FIG. 7 generally provides an example of a transport stream 704; the transport stream may include a header 712 and a payload. Each header 712 of the transport stream may further include various files including, but not limited to a sync byte, a transport error indicator, a payload unit start indicator, a transport scrambling control, a transport priority, a Program ID (PID), an adaptation field control 716, a continuity counter, and/or an adaptation field. Further, the adaptation field control 716 may include various fields including, but not limited to an adaptation field length, a discontinuity indicator, a random access indicator, an elementary stream priority, flags, optional fields 720, and stuffing bytes. Further, the optional field 720 may include, but is not limited to fields for a PCR, OPCR, splice countdown, transport private data, and adaptation field extension 724. In some embodiments, the adaptation field extension 724 may include an LTW field, a piecewise rate field, and a seamless splice field.

Figure 8:
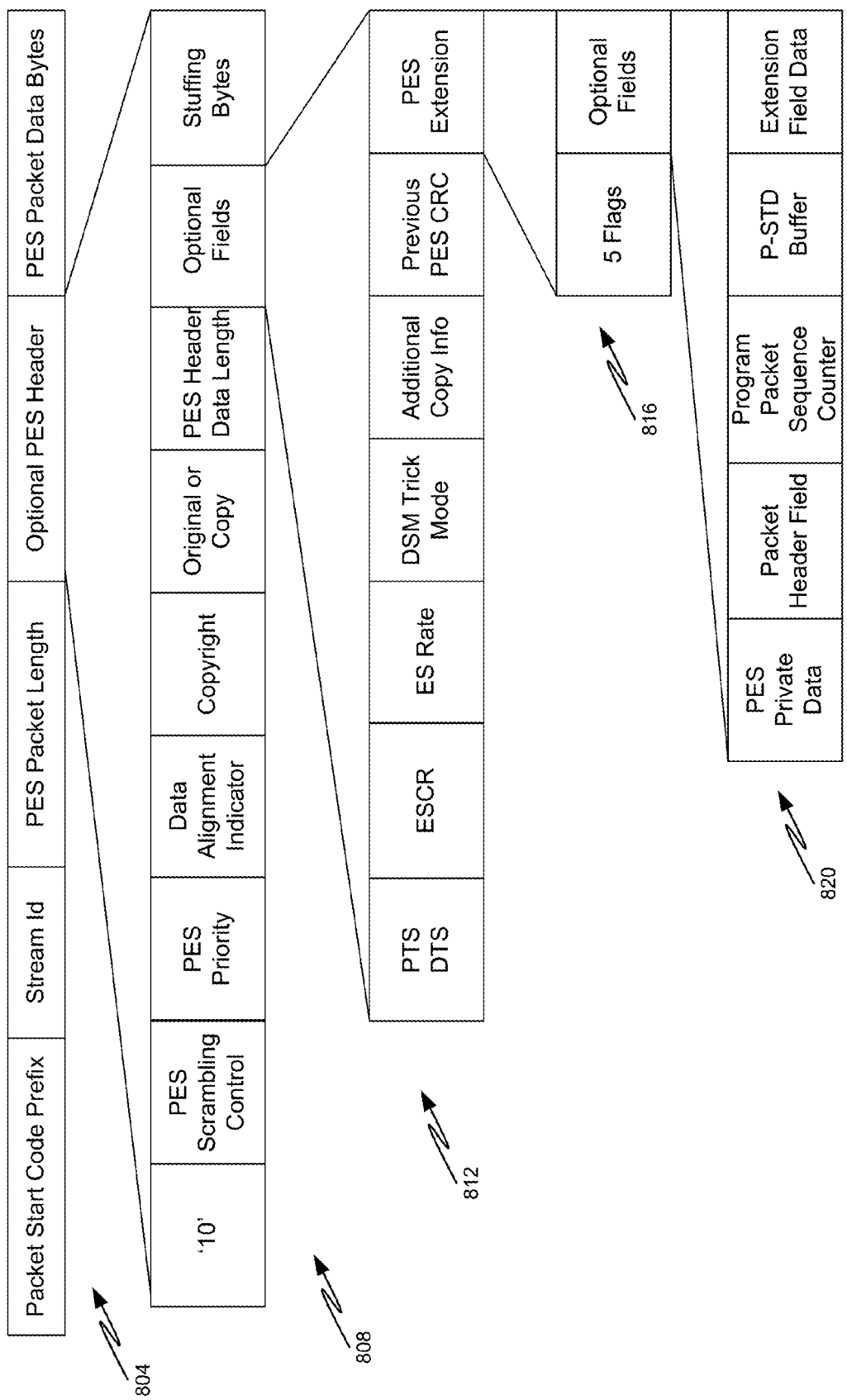
FIG. 8 depicts and example of a Packetized Elementary Stream (PES), including PES header information.

FIG. 8 generally provides an example of a packetized elementary stream (PES) 804—the PES may include, but is not limited to a packet start code prefix, a stream id, a PES packet length, an optional PES header 808, and PES packet data bytes. The optional PES header 808 may include, but is not limited to a PES scrambling control field, a PES priority field, a data alignment indicator field, a copyright field, and original or copy field, PES header data length field, an optional field 812, and stuffy bytes. The Optional fields 812 may include, but are not limited to PTS DTS, ESCR, ES Rate, DSM trick mode, additional copy info, previous PES CRC and PES extension 816 fields. The PES extension field may include but is not limited to flags and optional fields 820. Optional fields 820 may include, but are not limited to PES private data, packet header field, program packet sequence counter, P-STD buffer, and extension field data.

It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method comprising:
receiving a first data stream corresponding to a network feed;
receiving a second data stream corresponding to a provider feed;
comparing the first data stream to the second data stream to determine a data stream offset, wherein comparing the first data stream to the second data stream to determine the data stream offset includes:
creating a first perceptual hash of a first element in the first data stream;
creating a second perceptual hash of a second element in the second data stream;
determining a closeness of match between the first perceptual hash and the second perceptual hash; and
generating the data stream offset if the determined closeness of match between the first perceptual hash and the second perceptual hash is greater than a predetermined closeness of match threshold, wherein the data stream offset corresponds to a difference between a first timestamp associated with the first element and a second timestamp associated with the second element; and
generating a cue message, wherein the generated cue message includes one or more of: (i) the determined data stream offset, and (ii) a timestamp associated with the generated cue message and modified by the determined data stream offset.

2. The method of claim 1, further comprising:
transmitting the generated cue message to a content insertion device.

3. The method of claim 1, wherein the generated cue message is transmitted out-of-band.

4. The method of claim 1, further comprising:
altering a format of the generated cue message according to received formatting instructions; and
transmitting the cue message having an altered format, wherein the cue message having an altered format is transmitted out-of-band.

5. The method of claim 1, wherein the first element in the first data stream corresponds to at least one of: (i) a portion of a video frame; (ii) a portion of an audio slice; (iii) a Supplemental Enhancement Information (SEI) message; (iv) private data; and (v) data associated with a transport stream.

6. The method of claim 1, wherein the provider feed includes an altered version of the network feed.

7. The method of claim 1, wherein the generated cue message is in accordance with a Society of Cable Telecommunications Engineers (SCTE) 35 standard.

8. The method of claim 1, further comprising:
receiving at least one cue message associated with the first data stream.

9. The method of claim 8, wherein the generated cue message includes a modified version of the at least one cue message associated with the first data stream.

10. The method of claim 9, further comprising:
modifying a timestamp associated with the at least one cue message associated with the first data stream.

11. The method of claim 9, further comprising:
including the generated data stream offset as a timestamp adjustment.

12. A system that provides out-of-band broadcast trigger synchronization and communication to at least one downstream device, the system comprising:
a cue message detection synchronizer including:
at least one comparator configured to compare one or more data stream elements associated with a network feed to one or more data stream elements associated with a provider feed; and
an offset timing generator configured to generate an offset between the one or more data stream elements associated with the network feed and the one or more data stream elements associated with the provider feed,
wherein the cue message detection synchronizer is configured to create a first perceptual hash of the one or more data stream elements associated with the network feed, create a second perceptual hash of the one or more data stream elements associated with the provider feed, determine a closeness of match between the first perceptual hash and the second perceptual hash, generate the offset if the determined closeness of match between the first perceptual hash and the second perceptual hash is greater than a predetermined closeness of match threshold, wherein the offset corresponds to a difference between a first timestamp associated with the one or more data stream elements associated with the network feed and a second timestamp associated with the one or more data stream elements associated with the provider feed, and generate a cue message including one or more of: (i) the offset and (ii) a timestamp associated with the cue message and modified by the offset.

13. The system of claim 12, wherein the cue message is an altered version of at least one received cue message.

14. The system of claim 12, further comprising:
an ad splicer configured to receive an ad insertion message.

15. The system of claim 14, wherein the cue message is transmitted out-of-band.

16. The system of claim 12, wherein the one or more data stream elements associated with the network feed corresponds to at least one of: (i) a portion of a video frame; (ii) a portion of an audio slice; (iii) a Supplemental Enhancement Information (SEI) message; (iv) private data; and (v) data associated with a transport stream.

17. A non-transitory computer program product including computer executable instructions stored on a tangible medium, the instructions comprising:
instructions to receive a first data stream corresponding to a network feed;
instructions to receive a second data stream corresponding to a provider feed;
instructions to compare the first data stream to the second data stream to determine a data stream offset, wherein the instructions to compare the first data stream to the second data stream to determine the data stream offset include:
instructions to create a first perceptual hash of a first element in the first data stream;
instructions to create a second perceptual hash of a second element in the second data stream;
instructions to determine a closeness of match between the first perceptual hash and the second perceptual hash; and
instructions to generate the data stream offset if the determined closeness of match between the first perceptual hash and the second perceptual hash is greater than a predetermined closeness of match threshold, wherein the data stream offset corresponds to a difference between a first timestamp associated with the first element and a second timestamp associated with the second element; and
instructions to generate a cue message, wherein the generated cue message comprise includes one or more of: (i) the generated data stream offset, and (ii) a timestamp associated with the generated cue message and modified by the generated data stream offset.

18. The non-transitory computer program product of claim 17, further comprising:
instructions to receive at least one cue message associated with the first data stream.

19. The non-transitory computer program product of claim 18, further comprising:
instructions to modify a timestamp associated with the at least one cue message associated with the first data stream.

20. The non-transitory computer program product of claim 17, wherein the first element in the first data stream corresponds to at least one of: (i) a portion of a video frame; (ii) a portion of an audio slice; (iii) a Supplemental Enhancement Information (SEI) message; (iv) private data; and (v) data associated with a transport stream.

* * * * *

UNITED STATES PATENT AND TRADEMARK OFFICE
CERTIFICATE OF CORRECTION

PATENT NO.        : 9,148,707 B2                    Page 1 of 1
APPLICATION NO.   : 13/941255
DATED             : September 29, 2015
INVENTOR(S)       : Mark DiLorenzo It is certified that error appears in the above-identified patent and that said Letters Patent is hereby corrected as shown below:

In the Claims
Claim 17, column 20, line 12: DELETE "comprise"

Signed and Sealed this
Nineteenth Day of April, 2016

Michelle K. Lee
*Director of the United States Patent and Trademark Office*